United States Patent [19]
Baer

[11] 3,918,301
[45] Nov. 11, 1975

[54] FORCE OVERLOAD WARNING DEVICE
[76] Inventor: John S. Baer, Schooner Head, Bar Harbor, Maine 04609
[22] Filed: Apr. 24, 1974
[21] Appl. No.: 463,517

[52] U.S. Cl. ............... 73/141 A; 267/70; 267/162; 340/272
[51] Int. Cl.² .......................................... G01L 1/04
[58] Field of Search ............ 73/141 A, 143; 267/70, 267/162; 116/68, DIG. 34; 340/272

[56] References Cited
UNITED STATES PATENTS

| | | | |
|---|---|---|---|
| 2,559,800 | 7/1951 | Ryan, Jr. | 73/143 X |
| 3,033,154 | 5/1962 | Weisel | 73/141 A X |
| 3,082,733 | 3/1963 | Tamny | 73/141 A X |
| 3,372,581 | 3/1968 | Tell | 73/141 A |
| 3,683,355 | 8/1972 | Collins | 340/272 |

Primary Examiner—Charles A. Ruehl
Attorney, Agent, or Firm—Dorfman, Herrell and Skillman

[57] ABSTRACT

A stack of Bellville washers in two opposed arrays is provided such that the concavity of one array within the stack is directed in one direction, and the concavity of the opposed array in the stack is directed in the opposite direction. Means is provided preventing relative lateral movement of the washers. Corresponding edges of adjacent washers are in contact with one another, forming a wedge shaped annular space between the two arrays. Compression forces are applied at opposite ends of the stack. In preferred embodiments which respond to tension forces, the means applying the compressive forces have portions which extend past one another for connection to the tension applying structure such that, when tension is applied, compressive forces are exerted on the Bellville washers. The washers generally respond to Hooke's Law so that up to a predetermined amount of their deflection under a given amount of compressive force is predictable and switch means, for example, may therefore be located to be actuated after a predetermined relative movement between the compression means occurs. The number of washers included in the array and physical properties of individual washers will determine the point at which a predetermined deflection needed to actuate the switch will occur. Such movement is detected by detector and indicator means and occurs in response to a specific designed amount of tensile force within close tolerance limits and is repeatable over many tests.

16 Claims, 5 Drawing Figures

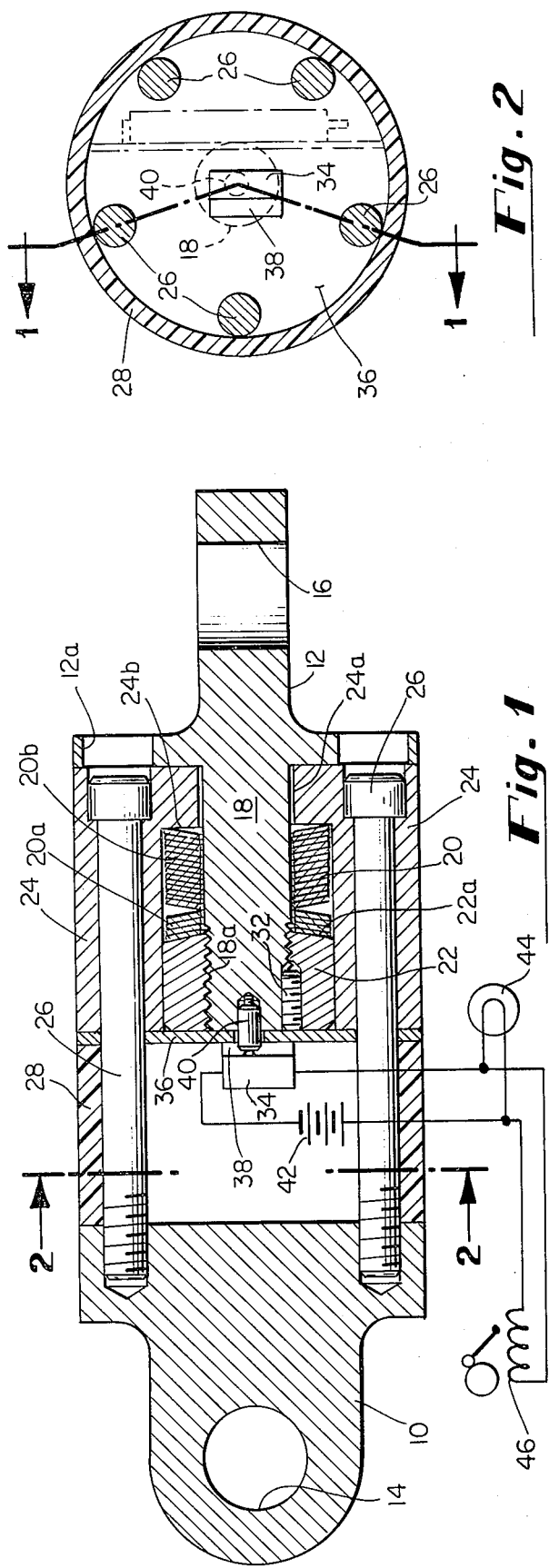
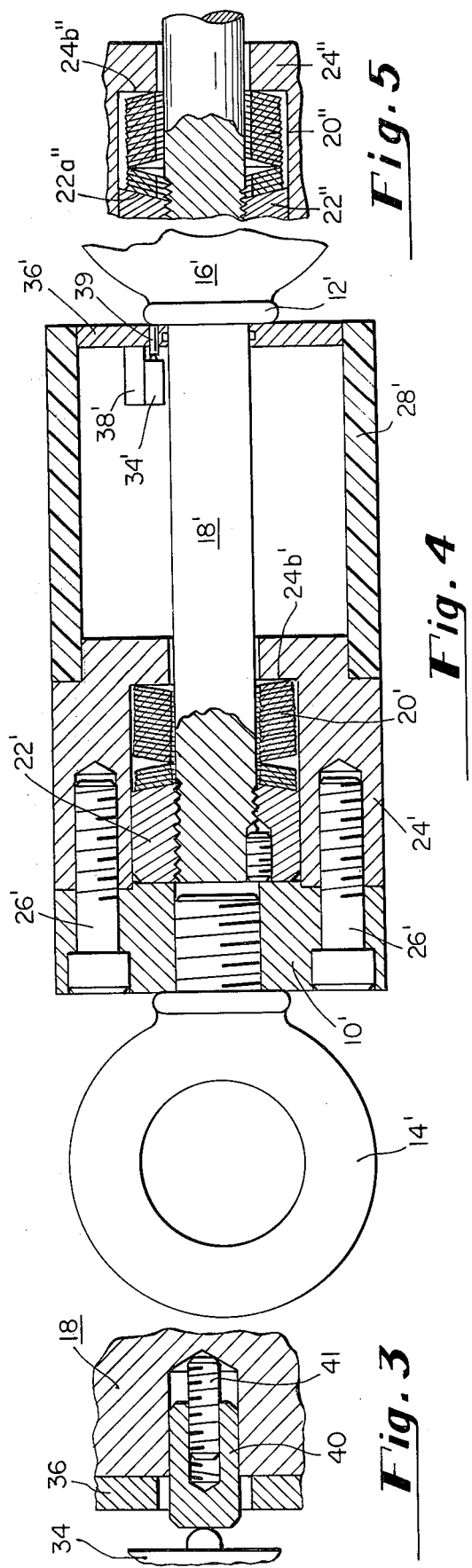

FORCE OVERLOAD WARNING DEVICE

The present invention relates to a force overload warning device which will detect a force equalling or exceeding a predetermined force within narrow limits of tolerance. More specifically, the present invention provides a simple mechanical system which will experience a predictable and repeatable amount of relative movement between parts when subjected to a force of predetermined amount. Therefore, detector means may be used to detect when the predetermined amount of force occurs by the sensing of that amount of relative movement of its parts.

In the prior art, various strain gauge load cells and other similar devices whose operation depends on the change of electrical resistance due to the strain within an electrical conductor, or the like, have been known and widely used for many years. Such devices are valuable for tests where it is desired to plot a curve of force against displacement, or the like. Under various conditions, such load cells can, of course, be used to measure forces applied to the structure. In combination with bridges or means detecting certain predetermined conditions of strain, load cells can, in fact, detect and indicate the occurrence of a predetermined condition. However, strain gauge load cells, which require careful bonding techniques and various precautions to make sure that they are operative under different environmental conditions, are expensive to produce, even though they are not highly complex in form. Furthermore, when one desires to detect equalling or exceeding a predetermined amount, auxiliary equipment is required and that equipment may substantially add to the cost.

The present invention is directed to a simple mechanical force detector which gradually and predictably yields under force and at a predetermined point, representative of a predetermined amount of force, actuates a simple switch in a signal circuit, or some other equally simple means, to produce an immediate visual or audible warning or a control signal which can be used to reverse, stop or otherwise modify action of the means applying force or some related means.

More specifically, the present invention relates to a force overload device comprising a plurality of axially aligned Bellville washers in a stack, including at least two washers providing opposed arrays of opposite orientation with edges of adjacent washers opposed and in contact, and defining between them a wedge shaped annular space. Means is provided to prevent the individual washers from moving laterally out of alignment. Compression means is provided conforming to the shape of the washer at one of the stack, but the other end is opposed to a non-conforming surface along which the adjacent washer may be flattened. The compression means at the opposite ends of the stack are so oriented as to apply force tending to compress and flatten the Bellville washers of the orientation corresponding to that one opposed to the non-conforming surface. Detecting and indicator means is provided to detect when a predetermined force is reached or exceeded by detecting the occurrence of relative movement between the compression means.

In a preferred embodiment, the compression means are a mechanically integral part of tension which bypass one another in a direction parallel to the application of tension. The compression means are on opposite sides of one another from the parts to which tension is applied and are therefore arranged to and do apply compressive forces to the Bellville washers when tension is applied to the tension members. Preferably, the arrays are capable of varying the number of washers selected, which determines the applied force at which the washer yield sufficiently produce the predetermined movement. The force required is directly proportional to number of washers in that array which is subject to flattening against the non-conforming compression member.

For better understanding of the present invention, reference is made to the accompanying drawings, in which:

FIG. 1 is a sectional view of a preferred embodiment of the present invention;

FIG. 2 is a cross-sectional view taken along line 2—2 of FIG. 1 and showing line 1—1 along which the section of FIG. 1 is taken;

FIG. 3 is an enlarged fragmentary sectional view of an area of FIG. 2 showing an adjustment feature;

FIG. 4 is a sectional view similar to that of FIG. 1, showing an alternative arrangement of the present invention; and FIG. 5 is a partial view corresponding to a portion of FIG. 4 showing a structural variation in the arrangement of washers.

Referring first to FIGS. 1 and 2, there is shown a force overload warning device in accordance with the present invention, in the preferred form of a tension overload warning device. In this particular embodiment, tension coupler members 10 and 12 specifically provide openings 14 and 16 for insertion of cable loops. In such event the severed ends of a cable, separated to permit inclusion of the force overload warning device are inserted through the openings 14 and 16 and spliced, clamped or otherwise conventionally connected in a loop back to themselves. The force overload warning device detects when the forces on the cable become excessive (i.e., tension exceeds a predetermined amount, which is a selected amount below the failure level of the cable).

In this particular embodiment the coupler member 12 has an axial shank extension 18 of cylindrical form, preferably having an outer diameter which permits a sliding fit with the inner diameter of a plurality of Bellville washers 20 and thereby acts to preserve the axial alignment of the washers, and prevent lateral movement of any of them relative to others. The end 18a of the shank is threaded to receive a threaded nut 22. Nut 22 provides one of the compression means and has a surface 22a contacting the adjacent Bellville washer conforming to the shape of that Bellville washer. Forces are transmitted through that conforming face to the adjacent washer and all the conforming washers in the array which are unable to move due to the mutual nesting or conformance of the array.

A cup shaped member 24 with a cylindrical hole 24a in its bottom, permitting passage of shank 18, is mechanically connected to tension member 10 by five similar tie-rods 26. The cup is axially spaced from the tension coupler 10 by a tubular non-metallic insulating sleeve 28, which acts both as a spacer and enclosure, enclosing a space in which detector means and related equipment may be housed. The sleeve advantageouly has an outer diameter corresponding to the outer diameter of the tension couplers 10 and 12 and the sidewalls of cup shaped number 24. The inner diameter of the sleeve 28 just fits around the circle defined by the tie-rods 26.

The bottom of the cup 24b provides an inwardly extending shoulder which does not conform to the shape of the adjacent conical face of the adjacent Bellville washer. Therefore the cup bottom 24b provides a compression means with a hardened face not conforming to the adjacent washer, along which the washer may slide and against which the washer may flatten as it and other corresponding oriented washers in its array are subjected to compression forces. A hardened working face may be more conveniently suppled by use of a hardened washer insert rather than hardening the cup bottom in some instances. However, as a practical matter it is preferred not to make the cup bottom flat but to make it partially conforming to keep the Bellville washers within their linear range and prevent any chance of permanent deformation because the washers have gone beyond their elastic range. For assembly and reference purposes tension member 12 is provided with a shoulder 12a extending radially outward from shank 18 against which the bottom of cup 24b rests during assembly and against which it is held as a stop as the nut 22 is tightened against the assembly of Bellville washers. It will be understood that contact of members 24b and 12a prevents further relative movement in one direction without preventing such movement in the other direction, the direction of relative movement of the cup bottom 24a toward nut 22.

Bellville washer, as used herein, refers to a sheet metal or other resilient sheet annular washer formed to a concave shape and normally deformed to a flat shape when subjected to sufficient compressive force. Such washers are characteristically deformable in accordance with Hooke's law, that is yielding specific distance in response to specific compression forces, and ordinarily in a linear manner with the deformation being resilient and repeatable. Linear response in such washers occurs up to 75%, or some other predetermined percentage, of full deformation or flattering. The repeatable performance and properties of Bellville washers make the present invention possible.

It will be obsserved that the Bellville washers are preferably grouped into two opposing arrays, 20a and 20b, such that each array has an opposite orientation of washer concavity. In this case array 20a is a stack of four against the conforming surface 22a of nut 22. Array 20b is a stack of 14 Bellville washers of opposite orientation opposed to the flat non-conforming bottom. As previously explained, the non-conforming flat surface of cup bottom 24a adjacent to the washers provides a surface over which the adjacent washer may slide and against which it may flatten in contrast to the conforming surface 22a. As a consequence, the only space between the washers, when they are relatively in an unstressed condition, is an annular space in cross section between the arrays 20a and 20b in the arrangement shown in FIG. 1 which is wedge shaped with the inner edges of the washers in a mutual contact and the outer edges of the washers spaced apart. In other arrangements the arrays might be so arranged that the outer edges of adjacent washers were in contact, thereby leaving an opening between the arrays with a cross section of the opening diverging in the opposite direction. Also in other arrrangements the conforming and non-conforming faces might be interchanged.

Keeping a two array configuration and changing washers from one array to the other is preferred, over a greater number of arrays, particularly because in the two array configurations the spacings remain the same despite interchange.

The structure of FIG. 1 permits easy assembly in that the cupped shaped member has the relatively closely conforming cylindrical hole 24a in its base, arranged to easily slide over the shank 18 of tension coupling member 12 until it bottoms on stop shoulder 12a. Thereafter, the washer 30 may be dropped into the bottom of the cup. The stack of washers forming array 20b may then be slid down shank 18 followed by the array 20a, of opposite orientation. It will be observed that the number of washers in the arrays, and hence overall dimensions, will be kept constant while changing the effective point of actuation of the device by tranferring washers, singly in groups, from one array to the other, as will be explained below. The nut 22 may then be threaded into position to hold the washers snugly in place against cup bottom 24a and, in turn, against stop shoulder 12a without applying significant force. In this position a locking screw 32 may be introduced between the shank 18 the nut 22 to prevent their relative rotational movement in order to fix the assembly in a zero force position in which the washers are snugly held between the compression means. The assembly thus constructed provides opposed arrays of Bellville washers 20a and 20b snugly held between compression means one of which conforms to the conical shape of the washers and the other of which is non-conforming and preferably flat. Forces applied between these compression means tend to compress and flatten the Bellville washers in the non-conforming array against the non-conforming means as force is applied to the conforming compression means.

It will be observed that force is applied to the device in this embodiment by tension rather than by compression so that the tension coupling members are mechanically part of the compression means, the tension coupling members in effect extending past one another and terminating in the compression means. More specifically, structure integral with compression means 24b bypasses structure integral with compression means 22. Cup 24, tie-rods 26 and tension coupler 10 are effectively integral and the bypass of the other compression member 22 converts applied tension forces to compression forces. Similarly, forces apppled through connection shank 18 from tension coupler 12 to compression member 22 are converted to compression forces by bypassing compression means 24b. This bypassing of each of the compression means by structure integral with the other allows the tensile forces applied to the tension coupling members to be transmitted to the respective conforming and non-conforming faces as compression forces.

It is the nature of Bellville washers to gradually yield in a linear manner according to Hooke's law under compressive forces. At a predetermined force a predictable amount of compression has occured and the compression means have assumed a predictable position relative to one another. In accordance with the present invention, this feature is used to advantage, the amount of force being controlled by increasing or decreasing the number of washers in the array opposed to the non-conforming compression means. The force level may be changed by simply modifying the number of washers in each array by inverting the required number of washers from the other array. The force required for the predetermined amount of movement will be determined by the array opposed to and flattening against the non-conforming compression means. The force required will be directly proportional to the number of washers in that array. Thus, the size of the total stack remains the same. For example, in a given structure Bellville washers might individually compress .50 inches under 500 pounds force. Using an array opposed to the non-conforming surface of two washers 1000 pounds would be required to produce the same deflection. Similarly if three washers were so oriented a force of 1500 pounds would be required. Thus by transferring the washers from one array to the other the force required for the same deflection could be changed in 500 pound increments without changing the dimensions of the system.

It will also be apparent that in this preferred embodiment the shank 18 provides a convenient means of stacking the washers in assembly and acts to prevent misalignment in use. It will be appreciated by one skilled in the art that the nesting within the arrays also help to preserve alignment and the sliding fit between the shank and the washers must not be too tight lest it inhibit the action of the washers. Alignment need not be within but, if done by an outer tubular or cup-like member, like cup 24, the fit should be loose enough to permit the washers to act.

In order to detect the predetermined amount of movement, when it occurs and trigger an alarm, a microswitch 34 is employed. The microswitch is suppoted in any suitable way on one of the tension member structures and is actuated by the other member with respect to it. In the embodiment shown, the microswitch is supported on the deck 36 by bracket 38. Deck 36 is held clamped between sleeve 28 and cup 24 by the tie-rod bolts 26. After the washer assembly has been completed, and the nut 22 put in place, an adjustable actuator pin 40 in the end of the shank 18 may be adjusted in position so that it will hold the plunger of microswitch 34 depressed against a built-in spring force. Depression of the microswitch plunger preferably holds the microswitch in open condition. Upon movement caused by the predetermined amount of compression of the washers, the plunger is released sufficiently to allow the microswitch to close. It will be understood that in other embodiments a normally closed microswitch may be used so that upon release of the plunger, the switch which has been held open will close. Other configurations operate to depress rather than release the switch plunger.

FIG. 3 is an enlarged view in the region of the actuator pin 40 which is received in and protrudes from a blind axially arranged hold in the end of shank 18. Its position in that hold is determined by a threaded screw element 41 which is received in a threaded axial hole in the end of pin 40 within the shank. The screw element projects beyond the pin 40 and into contact with the bottom of the hold. By axial adjustment of screw element 41 the relative positions of the pin 40 and the plunger of microswitch 34 may be adjusted as described above. The position of the pin is selected so that it will cause the switch plunger to move between open and closed switch positions within the range of movement which occurs as the Bellville washers deflect.

Adjustment is easily accomplished by insertion of feeler gauges between pin 40 and the switch plunger until proper action is achieved and then adjusting the screw element 41 the amount indicated by the feeler gauge.

When the switch is in position and adjusted the spacer 28 may be placed in position and any contents of the cavity within the spacer assembled. Then the tension member 10 may be put in position and the bolts 26 inserted and threaded into position as shown using the single acess hole 12b through tension coupler 12 to tighten each bolt. It will be apparent that due to the axial symmetry, the tension coupler members are relatively rotable with respect to one another, enabling the assembly of all bolts through the same hole.

The cavity defined by the sleeve 28 provides space for a battery 42 and a transmitter, if the device is to be radio controlled. If the device is to be simple circuit, as illustrated herein, the connected wires may pass through the sleeve 28 through an appropriate opening, or through some other portion of the housing. These wires, in turn, may be connected to a lamp 44 and/or a bell 46 or other conventional means to give visual and/or aural alarm. It is also possible to use the switch contacts of the microswitch 34 to control relays or even act directly to stop the tension producing the change in switch position or to reverse the action. Furthermore, the switch 34 may be used to actuate auxiliary equipment for any purpose rather than simply being a warning device.

It will be apparent to those skilled in the art that, in addition to the preferred structure shown in FIGS. 1, 2 and 3, many modifications are possible. FIG. 4 shows one such modification wherein the components are functionally much the same but structurally somewhat inverted. Parts having corresponding functions have been numbered the same as in FIG. 1 with the addition of primes thereto despite difference in physical shape. Thus, tension coupling members 10' and 12' assume slightly different form with coupling rings 14' and a similar coupling ring 16' (broken away in FIG. 8) arranged to receive cables. In this instance, the cup-like member 24' has its upper edge connected directly by tie-bolts 26' which are shorter, and only four of which are employed, without the use of an intermediate spacer. As in the previous arrangement, the groups of Bellville washers 20' are generally similar configurations arranged between compression means formed by the bottom of the cup 24b' and a nut 22 having a face conforming to the shape of the washers. As in the FIG. 1 embodiment the nut is threadably engaged by the shank 18' of the tension connected number 12'. In the FIG. 4 embodiment, however, nut 22' cannot provide a compressive force on the washers against cup bottom 24a until the member 10' is bolted into place. In this embodiment member 10' and nut 22' perform the stop function limiting movement to the direction permitted by washer collapse like members 24a and 12a do in the embodiment of FIGS. 1 and 2.

In the structure of FIG. 4 the shank 18' and tension member 12' are held together in a manner which involves greater machining problems but is otherwise feasible. Non-metallic housing-spacer member 28' in this instance is a cup-shaped structure with support deck 36' forming the bottom of the cup through a hold in which shank 18' must pass. Deck 36' also provides a shoulder against which an opposed shoulder 12a' of tension member 12' bears to hold the housing-spacer 28' in place. In assembly the shoulder 12a' against deck 36' prevents movement of the shank 18' relative to the cup 24' as washers are assembled and the nut 22' tightened until its washer conforming face snugly engages the washers. However, when member 10' is assembled it provides the permanent stop function, but allows movement away from the washer assembly as the washer is gradually flattened against the hardened non-conforming cup bottom surface 24b', which in this embodiment is also preferably partially conforming to prevent complete flattening of the washers. When assembly is completed the only movement possible occurs in array 20' upon washer flattening. In that process as shoulder 12a' moves away from deck 36' a predetermined amount produced by a predetermined amount of force, microswitch 34' supported by bracket 38' from deck 36' is actuated through an extended plunger 39. Preferably actuation is from normally open to a closed switch position in order to actuate circuitry similar to that of the FIG. 1 and 2 embodiment to provide an alarm.

In both embodiments shown microswitches have been used as the detection element. It will be clear to the man skilled in the art that other devices sensitive to relative movement may be used in place of microswitches. For example, a differential transformer may be employed and may even be used for monitoring various force levels if desired.

FIG. 5 shows a variation in the structure of FIG. 4 wherein the arrangement of washers 20'' is reversed necessitating reversal of the conforming surface 22a'' on the shoulder provided by nut 22''. It will be observed that the opposing shoulder provided by the bottom 24b'' of cup 24'' is unchanged. Operation of the device is essentially the same except that in compression of the washer 20'' the geometry is slightly different with the outer edges of the washers in the two arrays in contact rather than the inner edges.

It will also be clear to those skilled in the art, that other arrangements within the concept of the invention are possible. A simpler structure responsive to externally applied compressive forces, for example, does not require the complication of having the tension members bypass one another to operate upon the respective compressive means. Many other modifications are possible within the broad concept of the invention as defined by the claims. All such modifications are intended to be within the scope and spirit of the present invention. I claim 1. A force overload warning device comprising
a plurality of axially aligned Bellville washers, of similar shape in a stack, the washers in the stack being dividable into two oppositely oriented arrays, whereby edges of adjacent washers in the opposed arrays are in contact with one another and define between them a wedge-shaped annular space,
means to prevent the washers from moving laterally,
opposed compression means arranged to apply opposed forces tending to compress and Bellville washers, the compression means at one end of the stack presenting a surface conforming to the shape of the washers, and the compression means at the opposite end presenting a non-conforming surface against which the adjacent washer can flatten, provided that at least one washer is opposed to the conforming surface, and
detection and indicator means to detect when a predetermined amount of movement between said compression means has occurred upon experiencing a predetermined force dependent upon the number of washers in the array that are subject to flattening by the compressive force and to indicate when such force has been reached or exceeded.

2. The force overload warning device of claim 1 in which the proposed arrays of Bellville washers are so oriented that the inside edges of adjacent washers of the respective arrays are in contact with one another.

3. The force overload warning device of claim 1 in which the proposed arrays of Bellville washers are so oriented that the outside edges of adjacent washers of the respective arrays are in contact with one another.

4. The force overload warning device of claim 1 in which each of the Bellville washers employed is interchangeable and a plurality of such washers are employed in each array such that the actuation force may be modified by interchanging the washers in the two arrays keeping the total number in the stack and stack size the same.

5. The force overload warning device of claim 1 in which said means to prevent the washers from moving laterally comprises a central alignment structure over which the washers fit in sliding contact.

6. The force overload warning device of claim 1 in which said means to prevent the washers from moving laterally comprises an outer alignment structure at an outer edge of the washers and confining the washer arrays by a loose sliding fit.

7. A tension overload warning device comprising a plurality of axially aligned Bellville washers of similar shape in a stack with two opposed arrays, such that edges of adjacent opposed washers are in contact with one another and define between them a wedge-shaped annular space,
a pair of opposed compressed means having force applying surfaces arranged to compress said Bellville washers, the compression means at one end of the stack presenting a surface conforming to the shape of the washers in the array adjacent to the surface and the compression means at the opposite end presenting a non-conforming surface against which washers in the adjacent array compress and gradually flatten, and
bypass members attached to the respective compression means and bypassing the respective other compression means, such that tension applied to the respective bypass members acts through said bypass members to move said compression members toward one another and produce compressive force, one of said Bellville members including a circular cylindrical portion over which said Bellville washers fit in loose sliding contact, which cylindrical portion serves to prevent the washers from moving laterally, and
detection and indicator means to detect when a predetermined amount of movement between said compression means has occurred upon experiencing a predetermined force dependent upon the number of washers in the array that are subject to flattening by the compressive force and to indicate when such force has been reached or exceeded.

8. The tension overload warning device of claim 7 in which one compression means is an outwardly extending shoulder on the circular cylindrical bypass member portion.

9. The tension overload warning device of claim 8 in which the shoulder providing the compression means is a threaded nut engaging a threaded region of a cylindrical surface of said portion.

10. The tension overload warning device of claim 9 in which locking means is provided to hold the nut and the cylindrical surface in relative position once that position has been selected.

11. The tension overload warning device of claim 7 in which said compression means having force applying surfaces are shoulder elements on the bypass members, each of which bypass members acts as a tension coupling means, at least one of which shoulders is a removable and adjustable position shoulder on one of said bypasss members, abutting stop shoulders also being provided on the respective bypass members to abut and prevent relative movement in the direction opposite the direction required for compression of the Bellville washers in order to provide a reference for assembly.

12. The tension overload warning device of claim 11 in which the shoulder element on the by-pass member including a circular cylindrical portion is removable and adjustable and the other by-pass member is a cup whose shoulder element is the bottom of the cup, a hole through which bottom permits passage of the cylindrical portion of the other by-pass member with its shoulder element removed.

13. The tension overload warning device of claim 12 in which the cup is extended at its open end to provide a housing for at least some of the detection and indicator means, and in which releasable connection is provided whereby the housing can be assembled and disassembled by removal of the connection.

14. The tension overload warning means of claim 13 in which the housing is provided by a separable tubular extension of the cup sidewalls and an end cover providing a connection piece for a tension coupling member which is connected to the cup member by a plurality of bolts.

15. The tension overload warning device of claim 12 in which a housing is provided extending away from the closed end of the cup to provide a closure for the detection and indicator means.

16. The tension warning device of claim 7 in which the detection and indicator means is mounted on one of the opposed compression means and the other compression means is provided with an actuator pin protruding toward the detection means in the direction of movement from a hole in which the pin is snugly engaged in a sliding fit, and a screw element is engaged in a threaded hole in the pin and extends generally in the direction of the sliding fit into contact with the bottom of the hole, whereby pin position relative to the detection means may be adjusted.

* * * * *

UNITED STATES PATENT OFFICE
CERTIFICATE OF CORRECTION

Patent No. 3,918,301  Dated November 11, 1975

Inventor(s) John S. Baer

It is certified that error appears in the above-identified patent and that said Letters Patent are hereby corrected as shown below:

Column 1, line 31, after "detect" insert --forces--;
          line 65, after "tension" insert --means--;
Column 3, line 41, "flattering" should be --flattening--;
          line 44, "obsserved" should be --observed--;
Column 4, line 24, "shank 18 the nut 22" should be --shank 18 and the nut 22--;
          line 48, "apppled" should be --applied--;
          line 64, "force being" should be --force required being--;
Column 6, line 9, "the bolts 26" should be --the tie bolts 26--;
          line 11, "acess" should be --access--;
          line 14, "rotable" should be --rotatable--;
          line 18, "to be simple" should be --to be a simple--;
          line 19, "connected" should be --connecting--;
          line 40, "rings" should be --ring--;
          line 41, "Fig. 8" should be --Fig. 4--;
          line 52, "connected" should be --connection--;
          line 55, "24a" should be --24a'--;
Column 7, line 19, "from normally" should be --from a normally--
          line 37, "washer 20" should be --washers 20--;
          line 60, "and" should be --said--.
Column 8, line 54, "Bellville" should be --bypass--.

Signed and Sealed this

Sixth Day of July 1976

[SEAL]

Attest:

RUTH C. MASON  
Attesting Officer

C. MARSHALL DANN  
Commissioner of Patents and Trademarks